United States Patent [19]
Miyauchi

[11] Patent Number: 5,946,714
[45] Date of Patent: Aug. 31, 1999

[54] SEMICONDUCTOR STORAGE DEVICE UTILIZING ADDRESS MANAGEMENT TABLES AND TABLE STATE MAPS FOR MANAGING DATA STORAGE AND RETRIEVAL

[75] Inventor: Shigenori Miyauchi, Tokyo, Japan

[73] Assignee: Mitsubishi Denki Kabushiki Kaisha, Tokyo, Japan

[21] Appl. No.: 08/843,712

[22] Filed: Apr. 16, 1997

[30] Foreign Application Priority Data

Oct. 21, 1996 [JP] Japan .................................. 08-277797

[51] Int. Cl.⁶ .................................................. G06F 12/02
[52] U.S. Cl. ........................... 711/205; 711/103; 711/202
[58] Field of Search ................... 711/103, 206, 711/202, 205, 208, 209

[56] References Cited

U.S. PATENT DOCUMENTS

| | | | |
|---|---|---|---|
| 5,404,485 | 4/1995 | Ban .......................................... | 711/202 |
| 5,524,230 | 6/1996 | Sakaue et al. ........................... | 711/103 |
| 5,627,783 | 5/1997 | Miyauchi ............................. | 365/185.33 |
| 5,673,383 | 9/1997 | Sukegawa ............................ | 395/182.06 |
| 5,717,886 | 2/1998 | Miyauchi ................................. | 711/103 |
| 5,734,816 | 3/1998 | Niijima et al. ....................... | 395/182.06 |
| 5,740,396 | 4/1998 | Mason ..................................... | 711/103 |
| 5,812,814 | 9/1998 | Sukegawa ................................ | 711/103 |

FOREIGN PATENT DOCUMENTS 5-233426  9/1993  Japan.

*Primary Examiner*—John W. Cabeca
*Assistant Examiner*—Felix B. Lee

[57] ABSTRACT

A semiconductor storage device connectable to a host information processing apparatus having a flash memory section that stores data in sectors and wherein the flash memory section includes an address management table that stores information about the relation between logical sector numbers for data management in a host information processing apparatus and physical sector numbers for data management in the flash memory section. The flash memory section also includes a table state map that stores information about the physical locations at which the sector number information in the address management tables is stored. The semiconductor storage device also includes a flash memory control circuit for controlling data write and data read processing for the flash memory section. The control circuit refers to the table state map when the host information processing apparatus requests data write or data read to identify the physical location at which the corresponding address relation information is stored and converts the logical sector number received from the host information processing apparatus into a physical sector number based on the value stored at the identified location in the address management tables.

9 Claims, 7 Drawing Sheets

(a) Flash disk space (b) Cluster management space (a) Cluster management table (b) Table 0

(a) Cluster management table (b) Cluster - management - table state map

SEMICONDUCTOR STORAGE DEVICE UTILIZING ADDRESS MANAGEMENT TABLES AND TABLE STATE MAPS FOR MANAGING DATA STORAGE AND RETRIEVAL

BACKGROUND OF THE INVENTION

1. Field of the Invention

The present invention relates to semiconductor storage devices that have non-volatile memory of the block-erase type such as flash memory in which a predetermined unit of area can be erased at one time.

2. Description of the Related Art

Compact semiconductor storage devices using flash memory without drivers, that is, non-volatile memory that can write and erase electrically, are gaining ground with the spread of portable information equipment such as portable computers and digital still cameras. Data is usually transferred in blocks of 512 bytes between an information processing apparatus (called host computer hereafter) and a semiconductor storage device using flash memory. Also, in flash memory built in the semiconductor storage device, data is erased in erase blocks that are predetermined data units. The size of one erase block is from several kilobytes to tens of kilobytes, which are considerably larger than the unit of data transfer (512 bytes).

When data is rewritten in flash memory, it is necessary to rewrite a whole erase block that contains the data. For example, when a data block of 512 bytes is rewritten, the data in the erase block that contains the 512-byte data block, that is, a data block of several kilobytes to tens of kilobytes, is first temporarily sheltered in another area. Then, after the block is erased, the new data is written in the erased block together with the remaining part of the sheltered data. Consequently, the efficiency of writing is not good. Further, in flash memory, the number of erase operations is limited by an upper bound. Therefore, if data rewrite is concentrated in a particular erase block, then the number of erase operations can exceed the upper bound in a short period, and the flash memory becomes unusable.

In order to solve these problems, Japanese Pat. Kokai Hei 5-27924 discloses a semiconductor storage device having an address conversion table. FIG. 8 is a block diagram illustrating the semiconductor storage device having an address conversion table. As shown in the figure, the semiconductor storage device 31 comprises an interface circuit 13, through which data is conveyed between a host computer 12 and semiconductor storage device 31, a CPU 15 that controls the whole semiconductor storage device 31, a buffer 17 that temporarily stores data during the processing of data requested by host computer 12, flash memory 33, an address-conversion table RAM 19 that stores an address conversion table that associates each logical sector address (logical sector number) transmitted from host computer 12 with a physical sector address (physical sector number) in flash memory 33, and a flash-memory control circuit 21 that controls flash memory 33. Address-conversion table RAM 19 consists in SRAM (static RAM) or DRAM (dynamic RAM).

In this construction, when CPU 15 rewrites data in semiconductor storage device 31, CPU 15 does not process the erase block containing the data to be rewritten, but writes new data in a free area in flash memory 33 together with the remaining part of the original data of the erase block. Then CPU 15 rewrites the address conversion table with the physical sector address of the new erase block. After that, CPU 15 can associate each logical sector address in host computer 12 with a physical sector address in flash memory 33 by referring to the renewed address conversion table, so that data in flash memory 33 can be accessed.

However, a semiconductor storage device using such an address conversion table has to construct the address conversion table in address-conversion table RAM 19 by searching all the data in the flash memory during the startup time of the semiconductor storage device. Therefore, processing time for constructing the address conversion table is required, so that it takes considerable time to start the semiconductor storage device. Further, if the capacity of host computer 12 for power supply is low, then host computer 12 fails fast by power consumption for the processing of the address conversion table. Further, the address conversion table associates a logical address with a physical address for each sector. Therefore, as the memory size of the semiconductor storage device increases, the size of the address conversion table increases, so that the memory size of address-conversion table RAM 19 becomes great. As a result, the total cost of the semiconductor storage device also increases.

SUMMARY OF THE INVENTION

In order to solve the above problems, an essential object of the present invention is to provide a semiconductor storage device that reduces its startup time and hence power consumption during startup time.

In order to achieve the aforementioned object, according to one aspect of the present invention, in a semiconductor storage device connected to an information processing apparatus and having a memory section of flash memory that stores data in sectors and a control means that controls write and read processing for the memory section, the memory section has address management tables that store information about the relation between logical sector numbers for data management in the information processing apparatus and physical sector numbers for data management in the memory section and a table state map that stores information about the physical locations at which the information about sector numbers in the address management tables is stored. When the information processing apparatus requests data write or data read, the control means refers to the table state map with the logical sector number received from the information processing apparatus. Then the control means identifies the physical location at which the corresponding address relation information is stored. The control means converts the logical sector number into a physical sector number based on the value stored at the identified location of the address management tables.

According to a second aspect of the present invention, in a semiconductor storage device connected to an information processing apparatus, having a memory section of flash memory that stores data in units of a sector and a control means that controls write and read processing for the memory section, and managing data in clusters consisting of a plurality of sectors, the memory section has an address management table that store information about the relation between logical cluster numbers corresponding to logical sector numbers for data management in the information processing apparatus and physical cluster numbers corresponding to physical sector numbers for data management in the memory section and a table state map that stores information about the physical locations at which the information in the address management tables is stored. When the information processing apparatus requests data write or data read, the control means calculates a logical cluster number and an offset based on the logical sector number received from the information processing apparatus, and refers to the table state map with the logical cluster number. Then the control means identifies the physical location at which the corresponding address relation information about cluster numbers is stored. The control means converts the logical cluster number into a physical cluster number based on the value stored at the identified location of the address management tables. The control means then obtains a physical sector number from the converted physical cluster number and the offset.

According to a third aspect of the present invention, in a semiconductor storage device of the above first or second aspect, the address management tables have at least one table with a size of one sector. Further, the table state map stores information about the relation between table numbers for identifying the tables constituting the address management tables and the physical sector numbers of the sectors of the memory section in which the tables are stored.

According to a fourth aspect of the present invention, in a semiconductor storage device of the above first or second aspect, the size of one sector equals the size of one erase block that is the unit of data erase and data write in the memory section.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENT

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
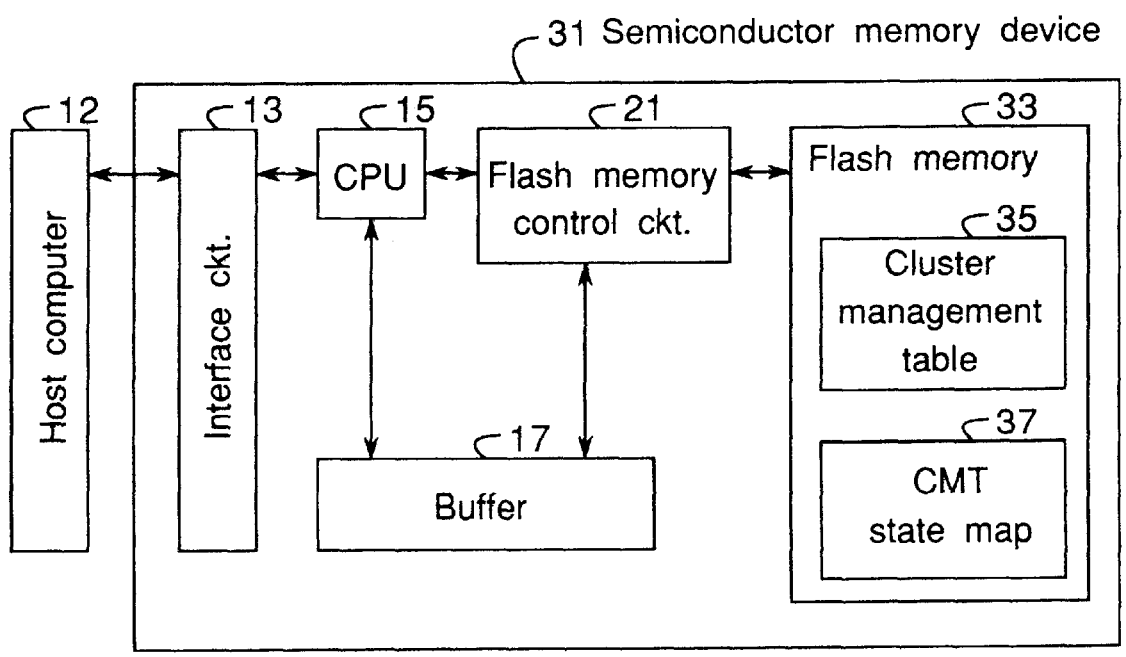
FIG. 1 is a block diagram illustrating a semiconductor memory device of the preferred embodiment of the present invention.
Figure 8:
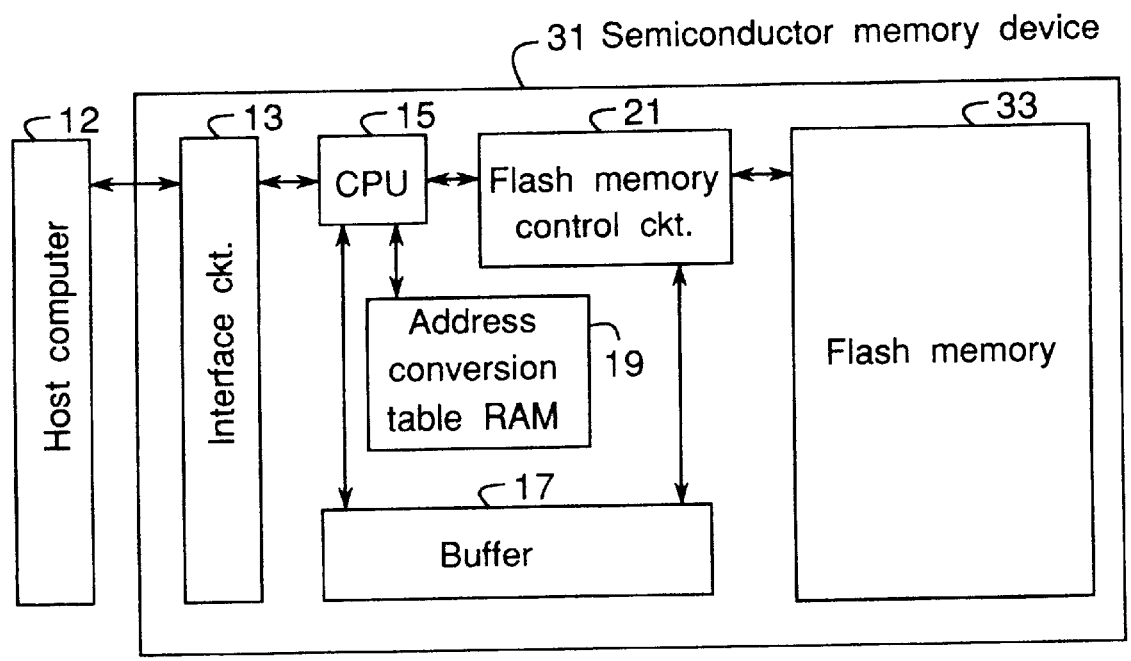
FIG. 8 is a block diagram illustrating a prior semiconductor storage device.

FIG. 1 is a block diagram illustrating a semiconductor storage device of the present embodiment. The same components as in the prior semiconductor storage device illustrated in FIG. 8 are denoted by the same reference numerals. As shown in FIG. 1, the semiconductor storage device 31 comprises an interface circuit 13, a CPU 15, a buffer 17, a flash-memory control circuit 21, and flash memory 33. Flash memory 33 has cluster management tables 35 and a cluster-management-table state map 37. Semiconductor storage device 31 is connected to a host computer 12 that is an information processing apparatus. Data is transmitted between semiconductor storage device 31 and host computer 12.

In semiconductor storage device 31, data is conveyed between semiconductor storage device 31 and host computer 12 through interface circuit 13. Flash memory 33 stores data and consists in a non-volatile and electrically erasable memory. CPU 15 controls the inside operation of semiconductor storage device 31. Flash-memory control circuit 21 performs write and read operation for flash memory 33 based on the control by CPU 15. In this case, flash-memory control circuit 21 performs data processing for flash memory 33 while temporarily storing data in buffer 17. In this way, CPU 15 and flash-memory control circuit 21 constitute a control means for flash memory 33.

When host computer 12 reads out data from semiconductor storage device 31 or writes data therein, host computer 12 sends a logical sector number, which is the sector address of the data to be read out or written in, to semiconductor storage device 31 through interface circuit 13. CPU 15 in semiconductor storage device 31 converts the logical sector number input through interface circuit 13 into a physical sector number, which is a sector address in flash memory 33, by using cluster management tables 35 and cluster-management-table state map 37. Then CPU 15 reads out data from or writes data in the area of flash memory 33 defined by the physical sector number.

Figure 2:
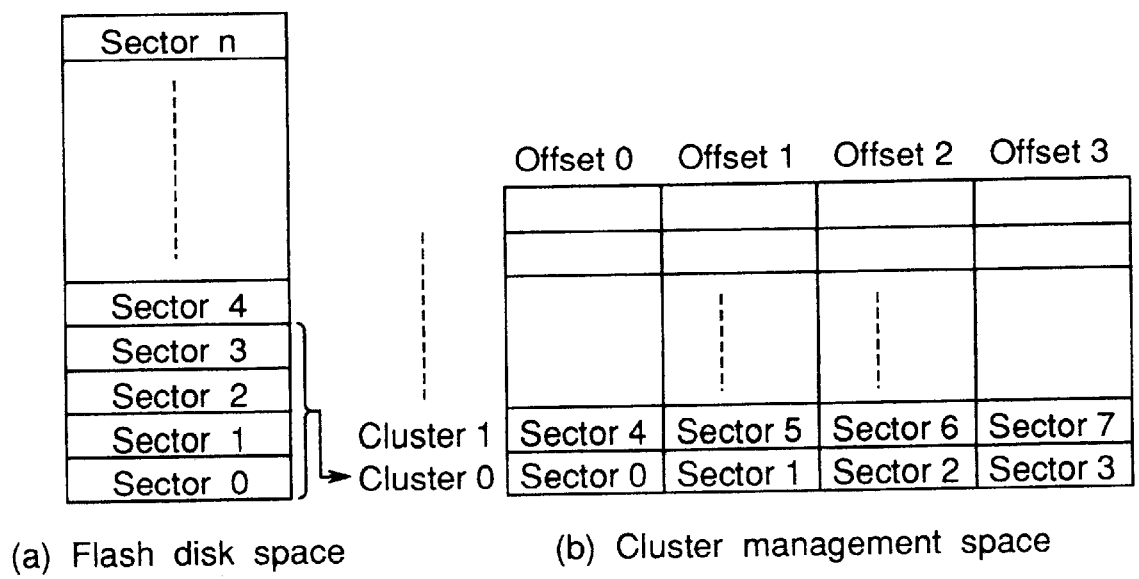
FIG. 2 is an explanatory diagram illustrating cluster management.
Figure 3:
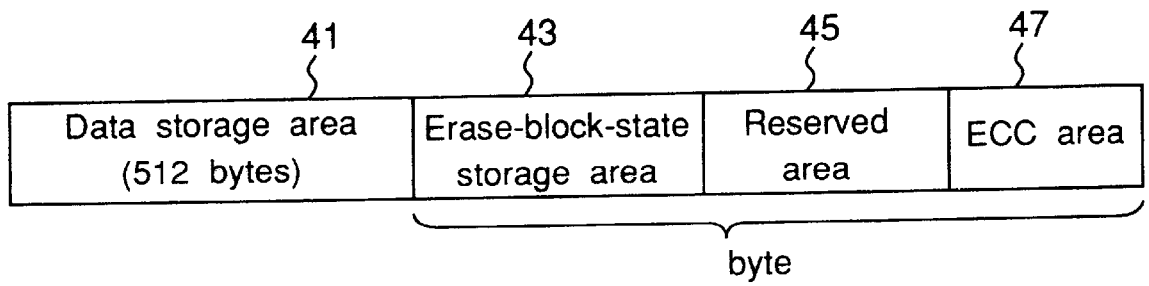
FIG. 3 is a diagram illustrating the structure of an erase block (sector) in the present embodiment.

The data area in flash memory 33 consists of a plurality of sectors, as shown in FIG. 2 (a). In the present embodiment, the size of one sector is the same as the size of one erase block that is the unit of data erase. In this way, data write or data erase can be made in sectors. FIG. 3 shows the structure of an erase block (sector) in the present embodiment. One erase block consists of a data storage area 41 (512 bytes), an erase-block-state storage area 43, a reserved area 45, and an ECC area 47. The size of one erase block is 512+α, where α is 16 bytes for example. Data storage area 41 stores data. Erase-block-state storage area 43 stores the number of times at which the erase block has been erased, the time spent for erasing and writing data in the erase block, and other information about the state of the erase block. The time spent for the data erasing is measured by an internal timer by CPU 15 and recorded during data write. CPU 15 can recognize the characteristics of individual erase blocks by referring to the information stored in erase-block-state storage area 43. For example, CPU 15 recognizes the time spent for erasing and writing data in individual erase blocks to judge that an erase block for which the time has been spent more than a predetermined length is defective and to substitute it with another block. Reserved area 45 is an area for auxiliary use, and data is usually not written therein. ECC area 47 stores an error-correction code that has been calculated by flash-memory control circuit 21 for the areas of the erase block except ECC area 47.

Further, semiconductor storage device 31 of the present embodiment bundles four sectors into one cluster and manages data in clusters, as shown in FIG. 2 (b). That is, semiconductor storage device manages logical sector numbers sent from host computer 12 and physical sector numbers in flash memory 33 in terms of clusters. In this cluster management, the location of a sector is identified by a cluster number that specifies a cluster and an offset within the cluster. For example, the location of sector 6 is identified by cluster number 1 and offset number 2.

In the present embodiment, flash memory 33 has cluster management tables 35 and cluster-management-table state map 37, as shown in FIG. 1, in order to facilitate data management in terms of clusters. Cluster management tables 35 and cluster-management-table state map 37 are described in the following.

Cluster management tables 35 relate logical cluster numbers corresponding to logical sector numbers sent from host computer 12 with physical cluster numbers corresponding to physical sector numbers in flash memory 33. CPU 15 converts logical sector numbers sent from host computer 12 into physical sector numbers in flash memory 33 using cluster management tables 35. In this way, physical sector numbers are associated with logical sector numbers by cluster management tables 35, so that the use of defective sectors in flash memory 33 can be avoided.

Figure 4:
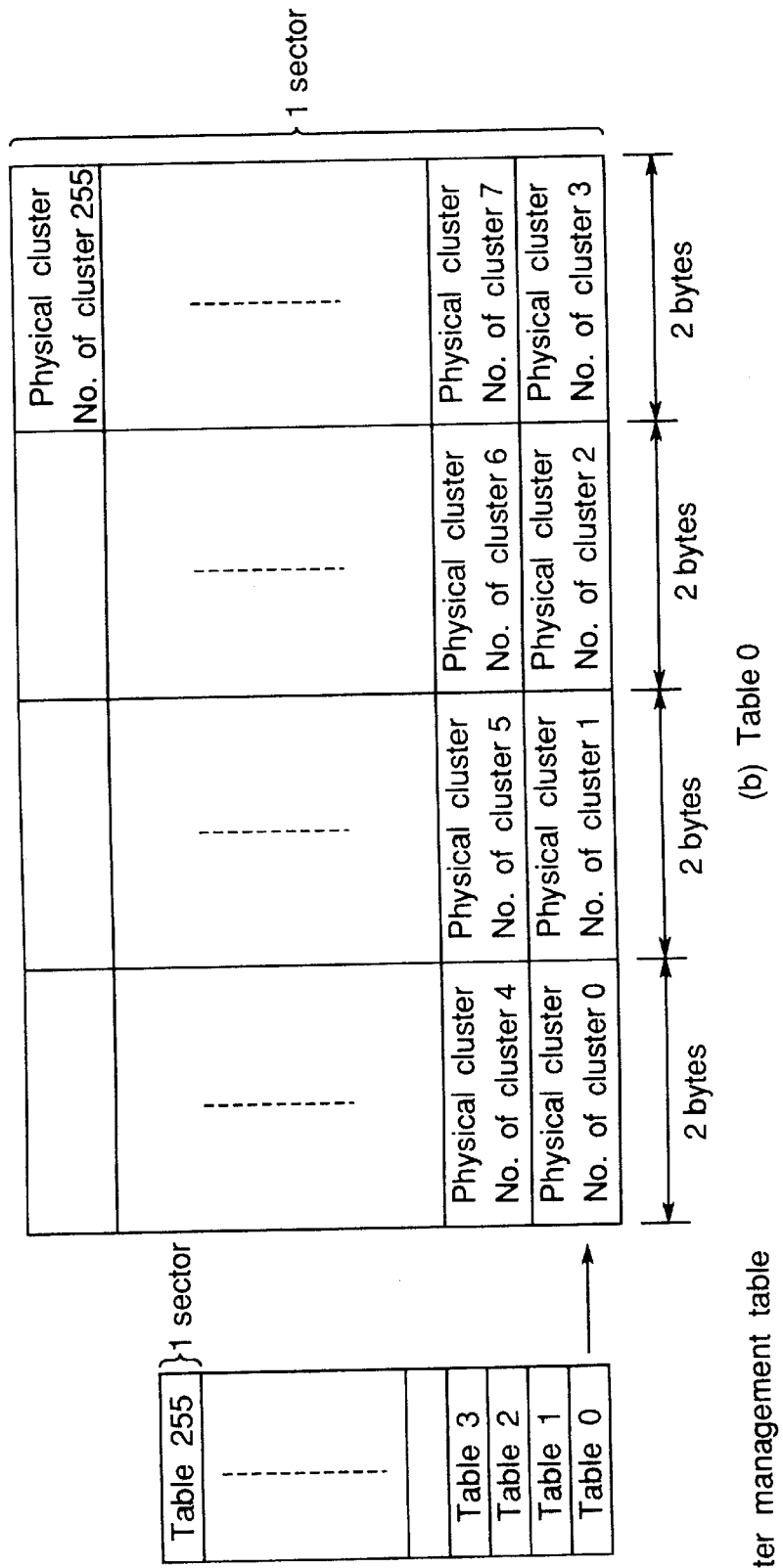
FIG. 4 is an explanatory diagram illustrating cluster management tables.

FIG. 4 shows the concept of cluster management tables 35. As shown in part (a) of FIG. 4, cluster management tables 35 consist of 256 tables, table 0 to table 255. One table occupies an area of one sector, that is, 512 bytes and manages physical cluster numbers corresponding to 256 logical cluster numbers. Therefore, cluster management tables 35 occupies 512 bytes×256=128 K bytes in all. Logical cluster numbers managed by the tables are successive. For example, table 0 manages the physical cluster numbers whose logical cluster numbers are 0 to 255. Table 1 manages the physical cluster numbers whose logical cluster numbers are 256 to 511. Each table of table 0 to table 255 successively stores a physical cluster number corresponding to a logical cluster number in an area of 2 bytes as shown in part (b) of FIG. 4. Therefore, the physical cluster number corresponding to a logical cluster number can be identified by the table number of a table in cluster management tables 35 and an offset within the table. Cluster management tables 35 are managed in terms of clusters, where 4 sectors, that is, 4 tables constitute one cluster.

Next, cluster-management-table state map 37 is described in the following. Cluster-management-table state map 37 is used for managing the physical cluster numbers that are the storage locations of the tables constituting cluster management tables 35 in flash memory 33. That is, cluster-management-table state map 37 shows where each table of cluster management tables 35 is located in flash memory 33. By this means, cluster management tables 35 can be assigned to a discontinuous area, if cluster management tables 35 cannot be stored in a continuous area in flash memory 33.

Figure 5:
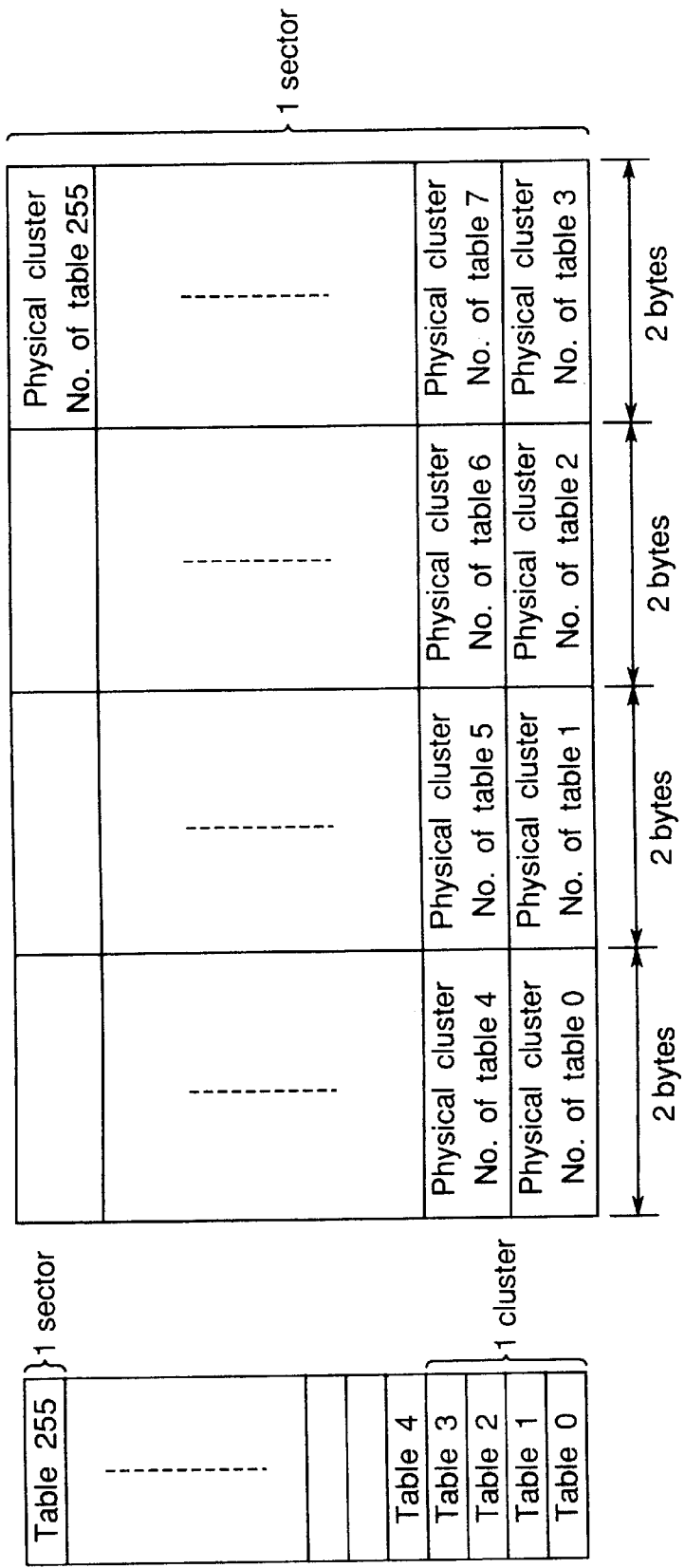
FIG. 5 is an explanatory diagram illustrating a cluster-management-table state map.

FIG. 5 shows the structure of cluster-management-table state map 37. As shown in part (b) of FIG. 5, cluster management-table state map 37 occupies an area of one sector and associates the table number of each table in cluster management tables 35 with the physical cluster number of the cluster in which the table is stored. That is, in the area of 512 bytes in which cluster-management-table state map is 37 is stored, each table is successively assigned to an area of 2 bytes, and the physical cluster number of the cluster in which the table is stored is stored in the assigned area. By referring to cluster-management-table state map 37, CPU 15 can identify the physical cluster in flash memory 33 in which a table in cluster management tables 35 is stored. In fact, CPU 15 can obtain the physical cluster number of the cluster in which a table in cluster management tables 35 is stored by searching cluster-management-table state map 37 regarding the table number of the table as an offset. For example, the cluster number of the cluster in which table 4 is stored is stored at the location of the offset 4 within the cluster-management-table state map 37.

Cluster-management-table state map 37 is stored in a predetermined area of flash memory 33. When power is turned on, the contents of cluster-management-table state map 37 are loaded in the RAM of CPU 15. Cluster management-table state map 37 is referred to by CPU 15, whenever data is read out or written in. Therefore, the read and write processing of data can be readily performed by loading the contents of cluster-management-table state map 37 in the RAM.

As described above, in semiconductor storage device 31 of the present embodiment, CPU 15 converts a logical sector number sent from host computer 12 into a physical sector number in flash memory 33 during data processing by referring to cluster management tables 35 and cluster-management-table state map 37. The procedure for data read in semiconductor storage device 31 is described in the following.

Figure 6:
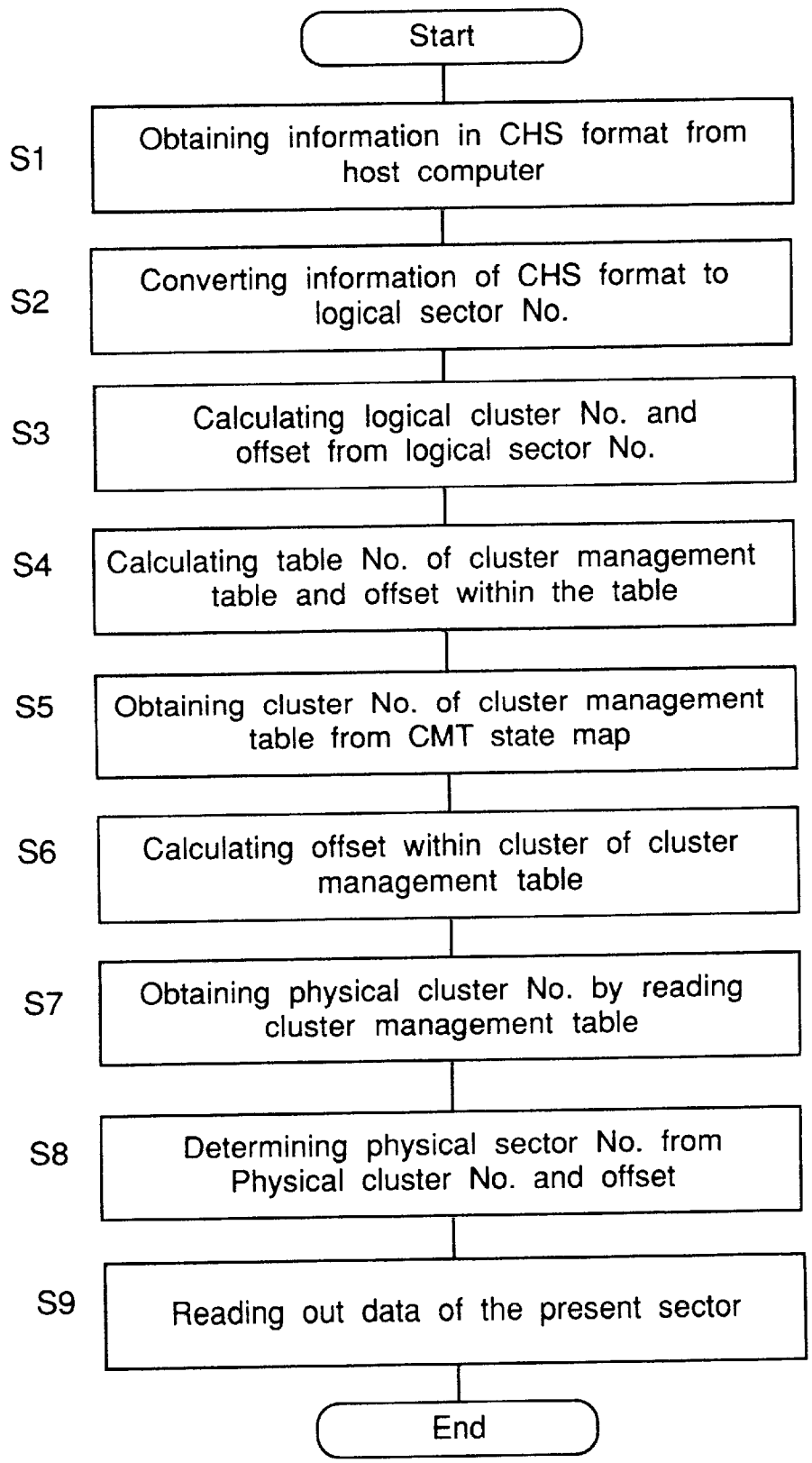
FIG. 6 is a flowchart illustrating the procedure for data read in the semiconductor storage device of the preferred embodiment.

FIG. 6 shows the procedure for data read in semiconductor storage device 31 in the case when a read request is issued by host computer 12. In the figure, when CPU 15 obtains sector number information in the CHS (Cylinder/Head/Sector) format (S1), Then CPU 15 converts the sector number information in the CHS format into a sector number (S2). A logical sector number can be directly sent in some cases as address information in place of the sector number information in the CHS format. In these case, the above steps S1 and S2 become unnecessary. Next, CPU 15 calculates a logical cluster number and an offset within the logical cluster (S3). This is done based on the following equations.

Logical cluster number=[Logical sector number/Sector number per cluster]. (1)

Offset within cluster=Logical sector number−Logical cluster number×Sector per cluster. (2)

Here [x] denotes the maximum integer not greater than x.

Here, both logical and physical sectors are managed in terms of clusters, so that an offset within a physical cluster becomes equal to the offset within the corresponding logical cluster, if converted into physical sectors. Therefore, the offset within the corresponding physical cluster can also be obtained from the equation (2).

Next, CPU 15 obtains the table number of cluster management tables 35 and the offset within the table to which the cluster of the calculated logical cluster number belongs (S4). Here, as described above, each table in cluster management tables 35 manages 256 clusters, so that the table number and the offset within the desired table can be calculated as follows.

Table number=[Logical cluster number/256]. (3)

Offset within table=Logical cluster number−Table number×256. (4)

Therefore, the physical cluster number corresponding to the logical sector number sent from host computer 12 is stored at the offset location obtained by the above equation (4) within the table of the table number obtained by the above equation (3).

After calculating the table number as above, CPU 15 obtains the physical cluster in flash memory 33 in which the desired table is stored. That is, CPU 15 obtains the physical cluster number of the cluster in which the desired table is stored by referring to the cluster-management-table state map 37 (S5). Here, as described above, cluster-management-table state map 37 successively stores the physical cluster number corresponding to each table of cluster management tables 35 in a 2-byte area. Therefore, the cluster number of the cluster in which the desired table is stored can be obtained by reading out the value stored in cluster-management-table state map 37 with the table number as the offset location.

In this way, the physical cluster number of the cluster in which the desired table is stored has been obtained. However, one cluster consists of 4 sectors, so that it is necessary to identify the sector in which the desired table is stored. Therefore, the offset within the cluster for the desired table, that is, the offset within the cluster at which the desired table is stored is calculated by the following equation (S6).

$$\text{Offset within cluster for table} = \text{Table number} - [\text{Table number}/\text{Number of Sectors per cluster}] \times \text{Number of Sectors per cluster.} \quad (5)$$

In this way, the physical sector in which the desired table is stored is identified by the physical cluster number obtained by referring to cluster-management-table state map 37 and the offset within the cluster for the desired table obtained from the equation (5). CPU 15 then transfers the data in this sector into buffer 17 and reads out the value at the offset location obtained from the equation (4) to obtain the physical cluster number corresponding to the logical cluster number (S7).

Next, CPU 15 obtains the physical sector number from the physical cluster number and the offset obtained from the equation (2) by the following equation (S8).

$$\text{Physical sector number} = \text{Physical cluster number} \times \text{Sector number per cluster} + \text{Offset.} \quad (6)$$

After obtaining the physical sector number corresponding to the logical sector number sent from host computer 12 in this way, CPU 15 reads out the data stored in the physical sector (S9). In this way, semiconductor storage device 31 uses cluster management tables 35 and cluster-management-table state map 37 to convert the logical sector number identified by host computer 12 into a physical sector number in flash memory 33 and reads out data.

The procedure shown in FIG. 6 is further clarified in the following with a numerical example in conjunction with FIGS. 7A to 7C. In this example, it is assumed that the number of sectors per cluster is 4, and the logical sector number obtained from the sector number information in the CHS format received from host computer 12 is 9227.

When receiving the sector number information in the CHS format from host computer 12 (S1), CPU 15 converts the sector number information into a logical sector number to obtain the logical sector number 9227 (S2). CPU 15 then calculates the logical cluster number and the offset within the logical cluster by the equations (1) and (2) (S3). That is, Logical cluster number=[9227/4]=2306.

Offset within cluster=9227−2306×4=3.

Therefore, the offset within the desired physical cluster is 3. Next, CPU 15 obtains the table of cluster management tables 35 and the offset within the table to which the cluster of the logical cluster number 2306 belongs (S4). That is, Table number=[2306/256]=9.

Offset within table=2306−9×256=2.

Therefore, the physical cluster number corresponding to the logical cluster number 2306 is stored at the offset 2 of table 9.

Next, CPU 15 obtains the physical cluster number of the cluster in which table 9 is stored by referring to cluster-management-table state map 37. This physical cluster number is stored at the offset 9 of cluster-management-table state map 37. FIG. 7A shows that this value is 03. Therefore, Table 9 is stored in the cluster of physical cluster number 3. Further, in order to identify the sector in the cluster of the physical cluster number 3, CPU 15 obtains the offset within the cluster at which table 9 is stored (S6).

Offset within cluster for table 9=9−[9/4]×4=1. FIG. 7B shows the location at which the data for table 9 is stored, that is, the physical sector at the offset 1 within the cluster of physical cluster number 3. CPU 15 then transfers the data of this sector into buffer 17 and reads out the value at the offset 2 within table 9 to obtain the desired physical cluster number (S7). FIG. 7C shows that this physical cluster number is 01. Therefore, CPU 15 obtains the desired physical sector number from this physical cluster number and the offset 3 within the cluster (S8) as Physical sector number=1×4+3=7.

Figure 7:
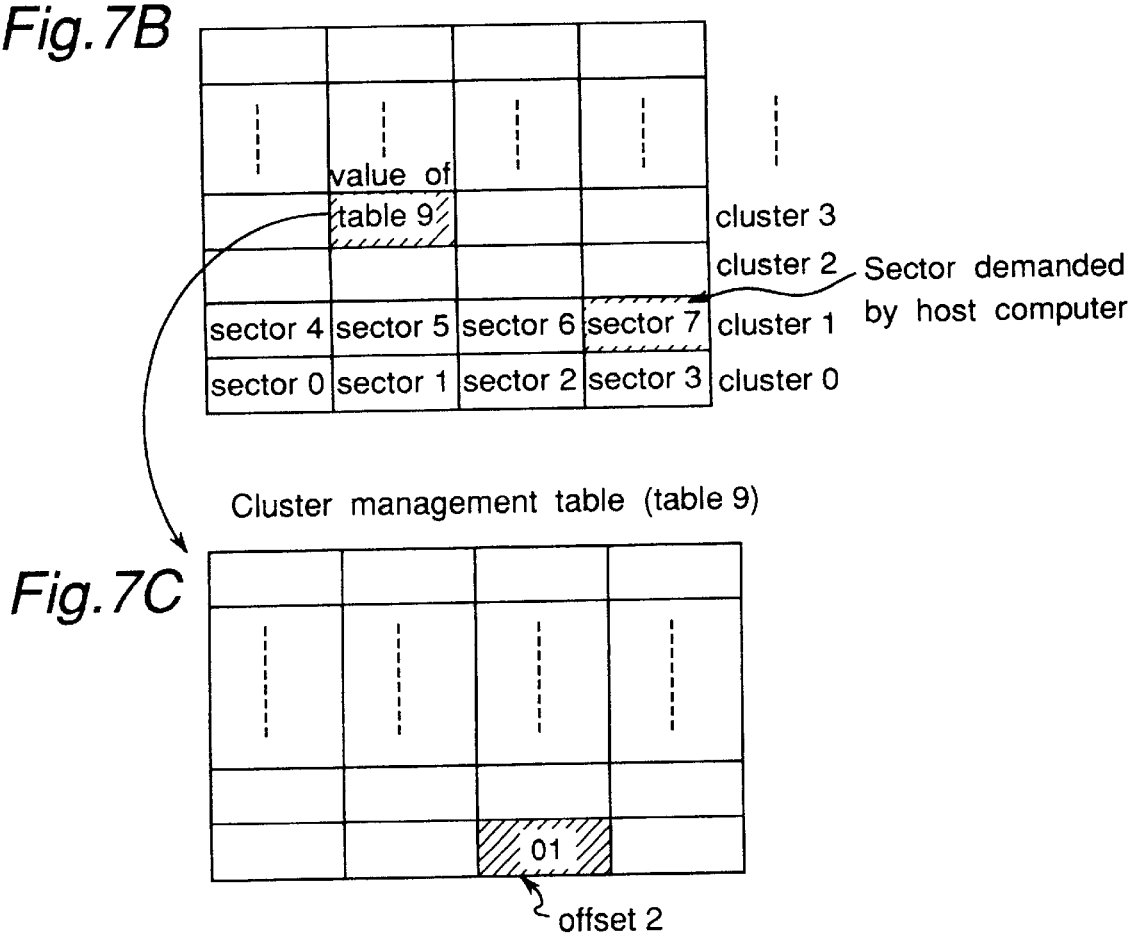
FIGS. 7A, 7B and 7C are explanatory diagrams illustrating examples of stored values in the cluster-management-table state map, the cluster management table, and the flash memory.

In this way, CPU 15 has obtained the physical sector number 7 in flash memory 33, and as shown in FIG. 7 (b), reads out the data stored in the sector of physical sector number 7 in flash memory 33 (S9).

The procedure for data read in semiconductor storage device 31 has been described above. The procedure for data write is similar. That is, CPU 15 converts the logical sector number sent from host computer 12 into a physical sector number following the above procedure using cluster management tables 35 and cluster-management-table state map 37. After the physical sector number is identified, CPU 15 executes an erase command to erase the data in the sector of the obtained physical sector number, and after that, writes data transmitted from host computer 12 in that sector.

In this way, the semiconductor storage device of the present embodiment can identify sectors in flash memory 33 by converting a logical sector number given by host computer 12 into a physical sector number to identify the desired sector in flash memory 33, using cluster management tables 35 and cluster-management-table state map 37. Therefore, the semiconductor storage device can readily perform data read and data write.

In the above description, four sectors constitute one cluster. However, the number of sectors per cluster can be varied depending on the memory size of flash memory 33. Following are examples. If the memory size is less than 32 megabytes, then the number of sectors per cluster is made 1. In this case, data is managed in terms of sectors instead of clusters. If the memory size is equal to or greater than 32 megabytes and less than 64 megabytes, the number of sectors per cluster is made 2. If the memory size is equal to or greater than 64 megabytes and less than 128 megabytes, then the number of sectors per cluster is made 4. If the memory size is equal to or greater than 128 megabytes and less than 256 megabytes, then the number of sectors per cluster is made 8. If the number of sectors per cluster is increased in this way as the memory size of flash memory 33 increases, then data can be managed without increasing the data area used for cluster management tables 35 and cluster-management-table state map 37.

As described above, in semiconductor storage device 31 of the present embodiment, the size of one erase block and the size of one sector is made equal in flash memory 33 with a small size of the erase block. A predetermined number of sectors are bundled into one cluster. Data is managed in terms of clusters by means of cluster management tables 35 and cluster-management-table state map 37 installed in flash memory 33. Cluster-management-table state map 37 manages the information about the locations at which the data in cluster management tables 35 are stored. CPU 15 converts a logical sector number sent from host computer 12 into a physical sector number for flash memory 33. Consequently, semiconductor storage device 31 does not require an address conversion table stored in an extra RAM, so that construction of hardware becomes simple. Further, the processing time for creating the address conversion table at the start of semiconductor storage device 31 becomes unnecessary, and avoids the accompanying power consumption.

According to a first semiconductor storage device in accordance with the present invention, its flash memory section has an address management table that stores information about the relation between logical sector numbers transmitted from an information processing apparatus and physical sector numbers in the flash memory section and a table state map that stores information about the physical locations at which the information about sector numbers in the address management table is stored. Therefore, the logical sector numbers can be converted into physical sector numbers in the flash memory section, so that an extra RAM outside the flash memory section becomes unnecessary for address conversion. Further, an address management table is installed in the non-volatile flash memory section, so that the processing for creating tables for address conversion becomes unnecessary during startup. Therefore, startup time is shortened, and power consumption during startup time is reduced.

According to a second semiconductor storage device in accordance with the present invention, data is managed in clusters consisting of a plurality of sectors, and the flash memory section has address management tables that store information about the relation between logical cluster numbers and physical cluster numbers and a table state map that stores information about the physical locations at which the information in the address management tables is stored. Therefore, effects similar to those in the above first semiconductor storage device are obtained. Further, the size of the address management tables becomes smaller than in the first semiconductor storage device. Still further, the size of the address management tables does not need to be made greater if the number of sectors per cluster is changed as the memory size of the memory section increases.

According to a third semiconductor storage device in accordance with the present invention, the address management tables have at least one table with a size of one sector. Further, the table state map stores information about the relation between table numbers for identifying the tables constituting the address management tables and the physical sector numbers of the sectors of the memory section in which the tables are stored. Therefore, the address management tables can be installed in discontinuous data areas of the flash memory section.

According to a fourth semiconductor storage device in accordance with the present invention, the size of one sector equals the size of one erase block that is the unit of data erase and data write in the memory section. Therefore, data erase and data write can be performed in sectors.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed is:

1. A semiconductor storage device connectable to a host information processing apparatus comprising:

a flash memory section that stores data in sectors wherein said flash memory section includes;

an address management table that stores information about the relation between logical sector numbers for data management in the host information processing apparatus and physical sector numbers for data management in said flash memory section;

a table state map that stores information about the physical locations at which the sector number information in said address management tables is stored;

control means for controlling write and read processing for said flash memory section, and wherein, said control means refers to said table state map, when the information processing apparatus requests data write or data read, to identify the physical location at which the corresponding address relation information is stored, and converts the logical sector number received from the information processing apparatus during a data write or data read request, into a physical sector number based on the value stored at the identified location in said address management table.

2. The semiconductor storage device according to claim 1, wherein said address management tables includes at least one table having a size of one sector, and said table state map stores information about the relation between table numbers for identifying the tables constituting said address management tables, and the physical sector numbers of the sectors of said flash memory section in which the tables are stored.

3. The semiconductor storage device according to claim 1, wherein the size of one sector equals the size of one erase block that is the unit of data erase and data write in said flash memory section.

4. A semiconductor storage device connectable to a host information processing apparatus, comprising:

a flash memory section that stores data in sectors wherein said flash memory section includes;

an address management table that stores information about the relation between logical cluster numbers corresponding to logical sector numbers for data management in the host information processing apparatus and physical cluster numbers corresponding to physical sector numbers for data management in said flash memory section;

a table state map that stores information about the physical locations at which the information in said address management tables is stored;

control means for controlling write and read processing for said flash memory section, and wherein said control means manages data in clusters having a plurality of sectors, calculates a logical cluster number and an offset when the host information processing apparatus requests data write or data read, based on the logical sector number received from the host information processing apparatus, and refers to said table state map based upon the logical cluster number received from the host information processing apparatus, to identify the physical location at which the corresponding cluster number address relation information is stored, converts the logical cluster number into a physical cluster number based on the value stored at the identified location in said address management table, and, obtains a physical sector number from the converted physical cluster number and said offset.

5. The semiconductor storage device according to claim 4, wherein said address management table includes at least one table having a size of one sector, and said table state map stores information about the relation between table numbers for identifying the tables constituting said address management table, and the physical sector numbers of the sectors in said flash memory section in which said tables are stored.

6. The semiconductor storage device according to claim 4, wherein the size of one sector equals the size of one erase block that is the unit of data erase and data write in said flash memory section.

7. A semiconductor storage device connectable to a host information processing apparatus comprising:

a flash memory section that stores data in sectors, said flash memory section including;

an address management table that stores information about the relation between logical sector numbers for data management in the host information processing apparatus and physical sector numbers for data management in said flash memory section and wherein said address management table is located within said flash memory section;

a table state map that stores information about the physical locations at which the sector number information in said address management tables is stored, and wherein said table state map is located within said flash memory section;

a flash memory control circuit connected to said flash memory section, said flash memory control circuit controlling write and read processing for said flash memory section, and wherein said flash memory control circuit refers to said table state map, when the information processing apparatus requests data write or data read, to identify the physical location at which the corresponding address relation information is stored, and converts the logical sector number received from the information processing apparatus during a data write or data read request, into a physical sector number based on the value stored at the identified location in said address management tables.

8. The semiconductor storage device according to claim 7 wherein said address management table includes at least one table having a size of one sector, and said table state map stores information about the relation between table numbers for identifying the tables constituting said address management tables, and the physical sector numbers of the sectors of said flash memory section in which the tables are stored.

9. The semiconductor storage device according to claim 7, wherein the size of one sector equals the size of one erase block that is the unit of data erase and data write in said flash memory section.

* * * * *